No. 779,787.  
PATENTED JAN. 10, 1905.

H. G. KOTTEN.  
PNEUMATIC TOOL.  
APPLICATION FILED MAR. 25, 1904.

Witnesses  
P. F. Nagle.  
L. Douville.

Inventor  
Herman G. Kotten.  
By Wiedersheim & Fairbanks  
Attorneys

No. 779,787.

Patented January 10, 1905.

UNITED STATES PATENT OFFICE.

HERMAN G. KOTTEN, OF NEW YORK, N. Y.

PNEUMATIC TOOL.

SPECIFICATION forming part of Letters Patent No. 779,787, dated January 10, 1905.

Application filed March 25, 1904. Serial No. 200,063.

*To all whom it may concern:*

Be it known that I, HERMAN G. KOTTEN, a citizen of the United States, residing in the city, county, and State of New York, have invented a new and useful Improvement in Pneumatic Tools, of which the following is a specification.

My invention relates to novel adjuncts for a pneumatic tool, more particularly designed for purposes of stone cutting or dressing; and it consists of means whereby an excessive and cumbersome crane or frame for the tool is dispensed with and in lieu thereof a simple and reliable support is provided which is adapted to be placed directly upon the block to be dressed, and the tool may be vertically adjusted, moved in right-lined and circular directions, and the apparatus may be shifted in a convenient and easy manner from place to place, the means employed to accomplish the various objects aforesaid being hereinafter set forth and the novel features being pointed out in the claims.

Figure 1:
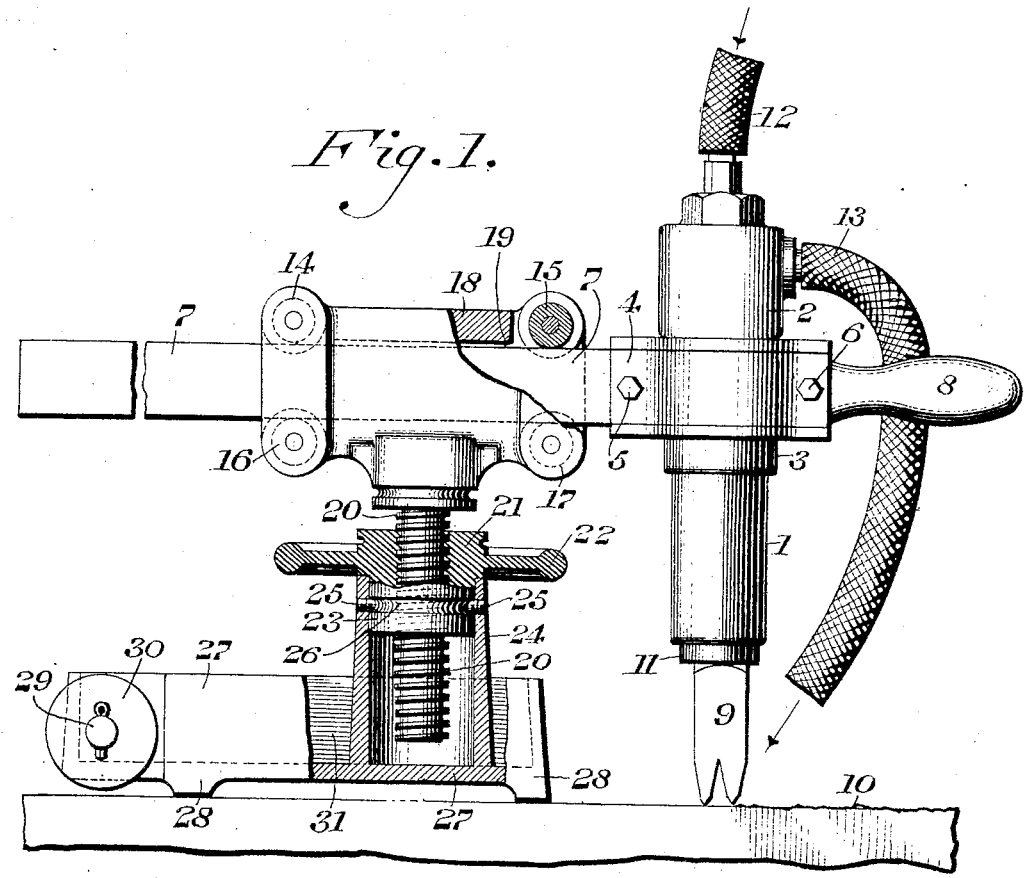
Figure 2:
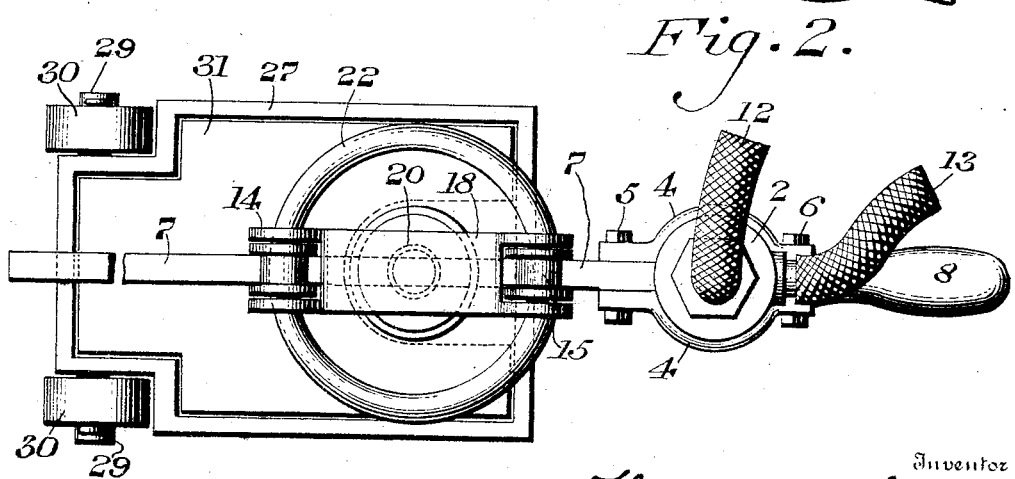

Figure 1 represents a partial side elevation and partial vertical section of a pneumatic tool embodying my invention. Fig. 2 represents a plan view thereof.

Similar numerals of reference indicate corresponding parts in the figures.

Referring to the drawings, 1 represents the cylinder or casing of a pneumatic tool, on the exterior of which are the shoulders 2 and 3, on the neck between which are the clamps 4, which embrace said neck and are tightly held together by the bolts 5 and 6 or equivalents.

7 designates a bar or arm which extends longitudinally from the cylinder 1 and is connected therewith by the clamps 4 and bolt 5.

8 designates a handle which extends from said cylinder 1 opposite to the arm 7 and is connected therewith by the clamps 4 and bolt 6.

9 designates a bit or cutter, the same being of any desired order for dressing surfaces or otherwise treating a block or piece 10 of material, which may be stone, granite, or the like, said bit being retained on the cylinder 1 by the nose-piece 11 or other suitable means thereof.

The pneumatic tool as such may be of any approved form; but I prefer to employ one similar to that shown in the following Letters Patent: No. 660,857, granted to Herman G. Kotten October 30, 1900, for a pneumatic tool; No. 726,074, granted to Herman G. Kotten April 21, 1903, for a pneumatic tool; No. 738,546, granted to Julius Keller September 8, 1903, for stroke-changing mechanism for pneumatic tools, and No. 739,609, granted to Herman G. Kotten September 22, 1903, for a pneumatic tool.

12 designates a flexible pipe or tube whereby a supply of motive fluid may be conducted to the cylinder, and 13 designates a flexible pipe or tube for directing the exhausted fluid to or toward the tool 9, so as to remove chips, dust, &c., from the block adjacent to the work-face of said tool.

14, 15, 16, and 17 designate rollers which are mounted, respectively, on the upper and lower portions of the head 18, the latter having the arm 7 passed freely therethrough, as at 19, said rollers contacting with said arm, and thereby supporting the latter, with its connected parts. Depending from said head 18 and firmly secured thereto is the threaded stem 20, which enters and engages with a threaded opening in the hub 21 of the hand-wheel 22. On the under side of said hub is the neck 23, which enters the tubular boss 24, the latter rising from the bed 27, which is provided with legs 28, by which said bed and superimposed parts are rested on the block 10.

25 designates screws or studs which pass through the side of the boss 24 and enter the horizontally-arranged groove 26 on the neck 23, thus swiveling the wheel 22 on said boss 24, it being noticed that the hub 21 of said wheel rests freely on the top of said boss and is sustained thereon.

On the rear end of the bed 27 are journals 28, on which are mounted rollers 30, said rollers being somewhat elevated above the surface of the block normally, but adapted to readily contact with and travel on said block when said bed is tilted slightly from its normal position.

Within the bed 27 is a weight 31 for counterbalancing the members of the device sustained on one end of the arm 7.

It will be seen that the head 18 and connected parts may be raised or lowered, so as to adjust the bit 9 to the face of the block 10, this being accomplished by the rotation of the wheel 22 and its action on the screw 20. The tool is supplied with fluid whereby the bit is manipulated, and the operator grasping the handle 8 directs the bit to the work to be performed, it being evident that the bit may be presented to the work in a direction to and from the bed 27 by moving the arm 7 to and fro in the head 18, eased by the rollers 14, 15, 16, and 17 while said arm remains sustained by said head and rollers, and as the screw 20 is held comparatively tight in the hub 21 the arm 7 may be turned with said screw and the wheel 22 on the boss 24, thus permitting said arm with the parts imposed thereon, to describe circular motions, the tool and the bit 9 following the same, and so being capable of reaching different fields on the block 10— say to the right and left of the bed 27. When it is desired to shift the apparatus to a fresh place on the block, it is tilted until the rollers 30 rest on the block 10, when the bed forms a truck by which the apparatus may be readily wheeled elsewhere without fatigue or inconvenience to the operator.

The tool may be removed by loosening the bolts 5 and 6 and clamps 4, after which it may be substituted by one of different size or nature and secured in position on the arm 7, as in the previous case.

In order to retain the weight or counterbalance in position and prevent shifting thereof, it is fitted between the sides of the bed and adapted to encircle the boss thereon.

I desire to call especial attention to the fact that in my invention the bed and its adjuncts are adapted to be placed directly upon the stone to be dressed and that the concrete unitary device is light and portable and capable of being readily shifted by a single operator to the desired point upon the block of stone or other material to be dressed.

So far as I am aware I am the first in the art to produce a light portable device of this character wherein the pneumatic tool is supported directly upon the block to be dressed and is capable of vertical and lateral adjustment, as well as a further adjustment toward and away from the supporting devices, and my claims to these features are to be interpreted with corresponding scope. It will further be understood by those skilled in the art that my present invention is distinguished from the prior cumbersome and expensive structures wherein the stone-dressing apparatus is supported from a frame carried by a post which is adapted to rest upon the ground. It is also distinguished from prior stone-channeling devices, which are also of an expensive and cumbersome nature and are incapable of performing the work for which my invention is adapted.

Various changes may be made in the details of construction shown without departing from the general spirit of my invention, and I do not, therefore, desire to be limited in each case to the same.

Having thus described my invention, what I claim as new, and desire to secure by Letters Patent, is—

1. The combination of a pneumatic tool, a bed adapted to rest upon the stone to be dressed and means intermediate of said bed and tool for sustaining the latter, said means comprising an arm attached to said tool, and devices located between said bed and arm and below the latter for vertically adjusting said arm and tool, the latter being capable of free movement toward and from said bed.

2. In a support for a pneumatic tool, a bed adapted to rest upon the stone to be dressed, a wheel swiveled thereon, a screw fitted in said wheel, and a movable sustaining device for said tool connected with said screw.

3. In a support for a pneumatic tool, a bed, a boss thereon, a wheel swiveled on said boss, a screw fitted in said wheel, a head connected with said screw, and an arm sustained on said head, said arm having said tool attached thereto.

4. In a device of the character named, a pneumatic tool, an arm attached thereto, a head provided with rollers movably sustaining said arm, a bed adapted to rest upon the surface of the stone to be dressed, and supporting means located below said arm and intermediate of the latter and said bed, for vertically adjusting said arm and tool, the latter being capable of turning laterally about said supporting means as an axis.

5. In a support for a pneumatic tool, a bed, a boss thereon, a wheel swiveled on said boss, a screw fitted in said wheel, a head connected with said screw, rollers mounted on said head, and an arm on said head attached to said tool, said arm being movably contained on said head between said rollers.

6. In a pneumatic tool, a bed adapted to rest upon the stone to be dressed and on which the tool and its sustaining members are mounted, said bed having rollers mounted thereon and elevated above the bottom thereof, and means for vertically adjusting said tool, the latter being capable of free movement toward and away from its supporting devices.

7. In a pneumatic tool, a movable bed adapted to rest upon the stone to be dressed and on which the tool and its sustaining members are mounted, and means on said bed for counterbalancing said tool and members, in combination with means for vertically adjusting the tool, the latter being capable of free movements toward and from its supporting devices, and means for permitting said tool to be turned laterally about the supporting devices as an axis.

8. In a device of the character named, a pneumatic tool, an arm, clamping devices for securing said tool to said arm, a head in which said arm is movably mounted, a screw depending from said head, a hand-wheel provided with a hub in which said screw engages, a boss in which said hub is mounted, a swiveling device for said hub, and a bed supporting said boss and adapted to rest on the stone to be dressed.

9. In a device of the character named, a pneumatic tool, an arm, clamping devices for securing said tool to said arm, a head in which said arm is movably mounted, a screw depending from said head, a hand-wheel provided with a hub in which said screw engages, a boss in which said hub is mounted, a swiveling device for said hub, and a bed supporting said boss and adapted to rest on the stone to be dressed, in combination with counterbalancing devices for said bed.

10. In a device of the character named, a pneumatic tool, an arm, clamping devices for securing said tool to said arm, a head in which said arm is movably mounted, a screw depending from said head, a hand-wheel provided with a hub in which said screw engages, a boss in which said hub is mounted, a swiveling device for said hub, and a bed supporting said boss and adapted to rest on the stone to be dressed, in combination with rollers for said bed, whereby the latter can be readily shifted according to requirements.

11. In a device of the character named, a pneumatic tool, an arm, clamping devices for securing said tool to said arm, a head in which said arm is movably mounted, a screw depending from said head, a hand-wheel provided with a hub in which said screw engages, a boss in which said hub is mounted, a swiveling device for said hub, and a bed supporting said boss and adapted to rest on the stone to be dressed, in combination with rollers on said bed normally out of contact with said stone, and counterbalancing devices for said bed.

12. In a device of the character named, the combination of a movable bed adapted to rest upon the stone to be dressed, a pneumatic tool, an arm attached to said tool, supporting devices intermediate said arm and bed, and means located below said arm, and intermediate the latter and said bed for vertically adjusting said arm and tool, the latter being capable of free movement toward and from its supporting devices.

13. In a device of the character named, the combination of a movable bed adapted to rest upon the stone to be dressed, a pneumatic tool, an arm attached to said tool, supporting devices intermediate said arm and bed, means located below said arm, and intermediate the latter and said bed for vertically adjusting said arm and tool, the latter being capable of free movement toward and from said supporting devices, and means for permitting said arm and tool to be turned laterally about said supporting devices as an axis.

HERMAN G. KOTTEN.

Witnesses:
E. HAYWARD FAIRBANKS,
C. D. McVAY.